(12) United States Patent
Tanaka et al.

(10) Patent No.: US 12,149,823 B2
(45) Date of Patent: Nov. 19, 2024

(54) OPTICAL APPARATUS AND CAMERA SYSTEM

(71) Applicant: CANON KABUSHIKI KAISHA, Tokyo (JP)

(72) Inventors: Hyochoru Tanaka, Tochigi (JP); Toshihiro Ogawa, Tokyo (JP); Tadanori Okada, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 241 days.

(21) Appl. No.: 17/846,175

(22) Filed: Jun. 22, 2022

(65) Prior Publication Data
US 2023/0016323 A1 Jan. 19, 2023

(30) Foreign Application Priority Data
Jul. 13, 2021 (JP) .................................. 2021-115520

(51) Int. Cl.
*H04N 23/67* (2023.01)
*H04N 23/54* (2023.01)
*H04N 23/55* (2023.01)
*H04N 23/65* (2023.01)

(52) U.S. Cl.
CPC ............. *H04N 23/67* (2023.01); *H04N 23/54* (2023.01); *H04N 23/55* (2023.01); *H04N 23/65* (2023.01)

(58) Field of Classification Search
CPC ........ H04N 23/67; H04N 23/54; H04N 23/55; H04N 23/65; G03B 3/02; G03B 3/10; G03B 17/04; G03B 2205/0046; G03B 2205/0053
See application file for complete search history.

(56) References Cited

U.S. PATENT DOCUMENTS

| 7,453,513 B2 | 11/2008 | Makii | |
|---|---|---|---|
| 2018/0278817 A1* | 9/2018 | Shimizu | G03B 17/14 |
| 2021/0211570 A1* | 7/2021 | Kunitomo | H04N 23/663 |
| 2023/0393367 A1* | 12/2023 | Uchida | G02B 27/646 |

FOREIGN PATENT DOCUMENTS

| JP | 2005134783 A | 5/2005 |
|---|---|---|
| JP | 2011039387 A | 2/2011 |
| JP | 4683795 B2 | 5/2011 |
| JP | 2013156490 A | 8/2013 |

* cited by examiner

*Primary Examiner* — Kelly L Jerabek
(74) *Attorney, Agent, or Firm* — ROSSI, KIMMS & McDOWELL LLP

(57) ABSTRACT

An optical apparatus capable of detecting an origin or the like even in a retracted state is provided. The optical apparatus includes a holding frame holding an optical system, an intermediate member, a driving unit moving the intermediate member in a direction along an optical axis of the optical system, a biasing member biasing the holding frame in a direction along the optical axis with respect to the intermediate member, and a detection unit detecting the intermediate member, and the optical apparatus also includes a first state in which a part of the holding frame is brought into contact with a part of the intermediate member according to a biasing force of the biasing member, and a second state in which the holding frame is separated from the intermediate member against the biasing force of the biasing member, in which the driving unit is able to move the intermediate member in a direction along the optical axis in either the first state or the second state, and the detection unit can detect the intermediate member at least in the second state.

13 Claims, 15 Drawing Sheets

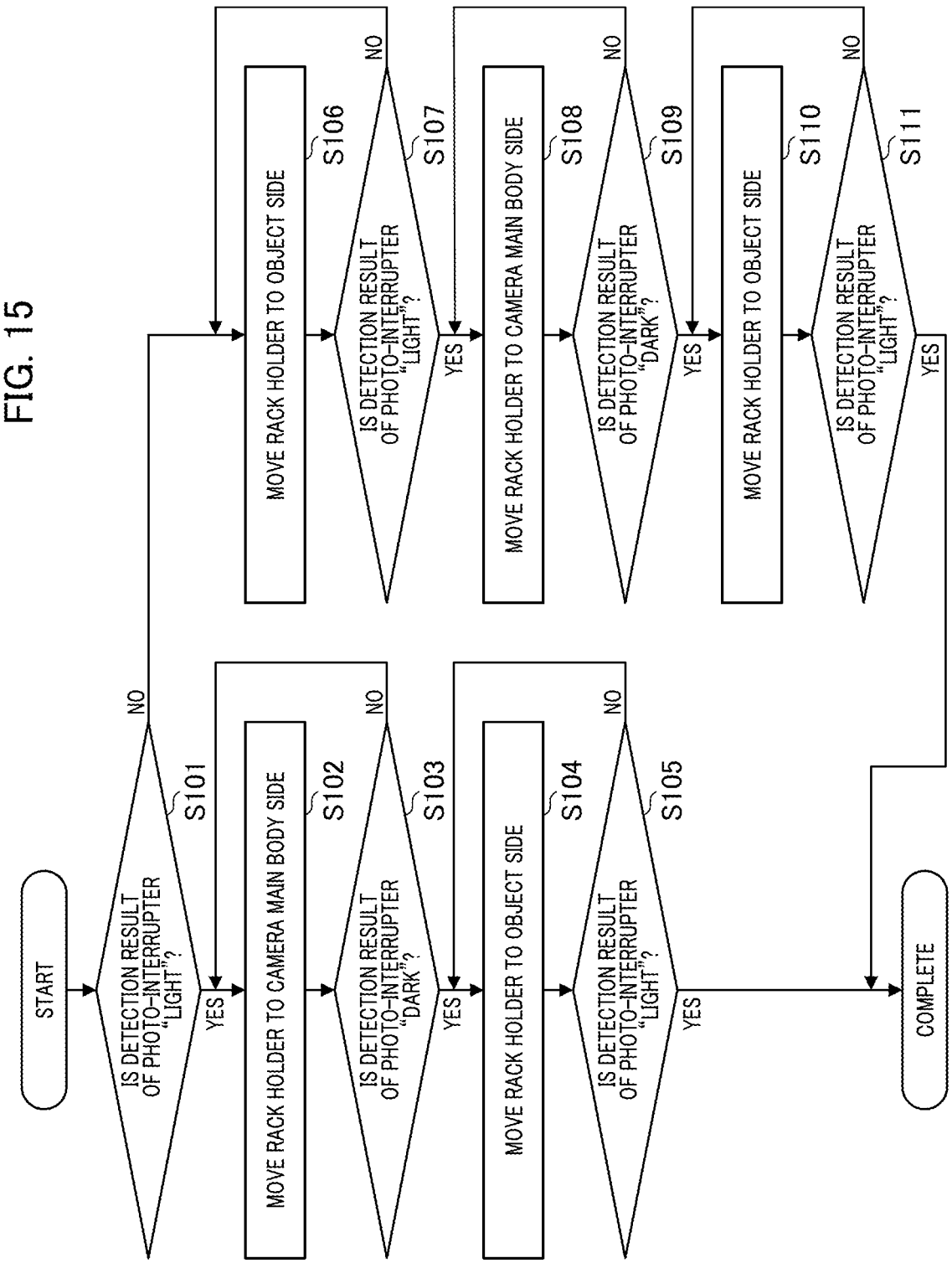

OPTICAL APPARATUS AND CAMERA SYSTEM

BACKGROUND OF THE INVENTION

Field of the Invention

The present invention relates to an optical apparatus and a camera system.

Description of the Related Art

Optical apparatuses such as digital cameras, video cameras, and interchangeable lenses in recent years have been required to be improved in portability when they are carried, and miniaturization can be achieved especially at the time of non-imaging by employing a retractable mechanism. A retractable mechanism refers to a mechanism in which reduction in the entire length of an optical apparatus in an optical axis direction is realized by reducing distances between lens groups when a state in which imaging is possible shifts to a retracted state in which imaging is restricted.

As an example of a retractable mechanism, Japanese Patent No. 4683795 discloses a digital camera whose entire length is reduced particularly by reducing a movement range of a focus group in a retracted state in which imaging is restricted. The retractable mechanism described in Japanese Patent No. 4683795 includes a focus group, a transmission member (feed screw) that converts a rotational driving force of a focus motor into a propulsive force in an optical axis direction, and a biasing spring that biases the focus group to the transmission member. Then, in a state in which imaging is possible, the focus group and the transmission member are brought into contact with each other and moved integrally. In contrast, in a retracted state in which imaging is restricted, there is a configuration for reducing a movement range of the focus group by separating the focus group from the transmission member against a biasing force.

A focus motor generally employed is limited to control of a relative drive amount. Therefore, drive control of a focus group requires detection processing of an origin position (reset processing). Therefore, Japanese Patent No. 4683795 is configured to include a light-shielding part and an optical detection unit, and detect an origin position by transitioning between a transmission state and a light-shielded state by moving the focus group.

However, for example, in a case of an interchangeable lens, if energization is suddenly interrupted when the interchangeable lens is mechanically removed from the camera main body or a battery serving as a power source is pulled out, the focus group remains held at the position at the time of the energization interruption, and detection is not possible. In such a state in which a current position of the focus group is undefined, first, origin detection processing of the focus group has to be executed temporarily before imaging is started.

On the other hand, when a retractable mechanism in which a movement range of the focus group is reduced is employed as in Japanese Patent No. 4683795, since movement of the focus group is restricted, origin detection processing cannot be executed until a shift to a state in which imaging is possible is completed. That is, since an extra time for origin detection processing of the focus group is required when a retracted state in which imaging is restricted has shifted to a state in which imaging is possible, there is a likelihood that this will lead to loss of imaging opportunities.

SUMMARY OF THE INVENTION

Therefore, an objective of the present invention is to provide an optical apparatus capable of detecting an origin or the like even in, for example. a retracted state.

In order to achieve the above-described objective, an optical apparatus as one aspect of the present invention includes a holding frame holding an optical system, an intermediate member, a driving unit moving the intermediate member in a direction along an optical axis of the optical system, a biasing member biasing the holding frame in a direction along the optical axis with respect to the intermediate member, and a detection unit detecting the intermediate member , and the optical apparatus also has a first state in which a part of the holding frame is brought into contact with a part of the intermediate member according to a biasing force of the biasing member, and a second state in which the holding frame is separated from the intermediate member against the biasing force of the biasing member, in which the driving unit is able to move the intermediate member in a direction along the optical axis in either the first state or the second state, and the detection unit is able to detect the intermediate member at least in the second state.

Further features of the present invention will become apparent from the following description of exemplary embodiments with reference to the attached drawings.

BRIEF DESCRIPTION OF THE DRAWINGS

FIG. 15 is a flowchart of origin detection processing according to the example.

DESCRIPTION OF THE EMBODIMENTS

Figure 1A:
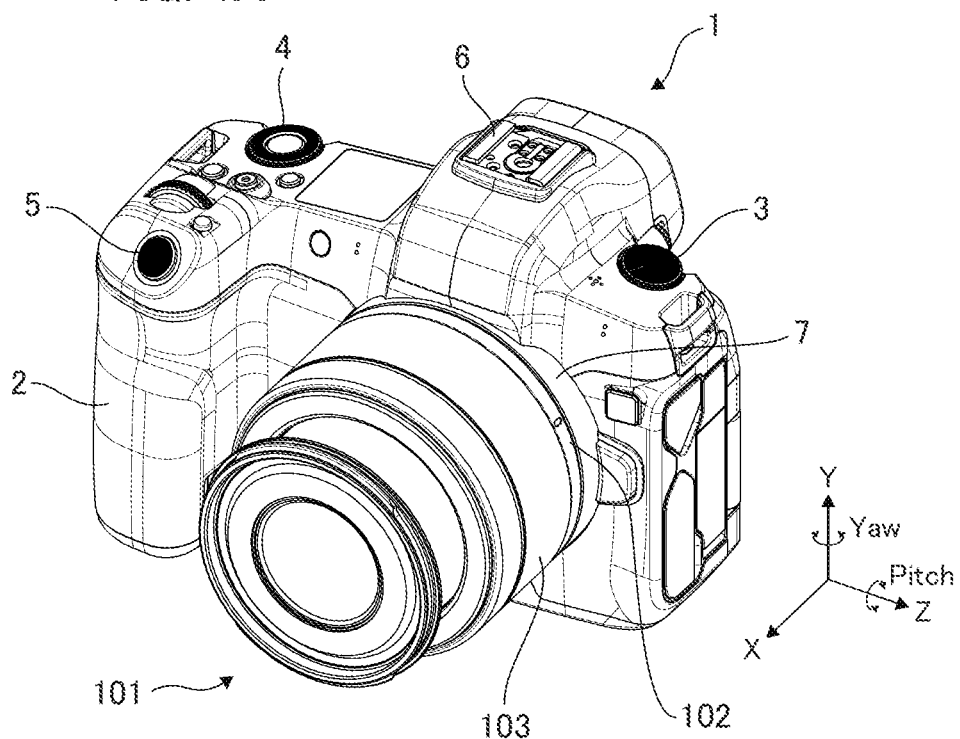
FIGS. 1A and 1B are a front perspective view and a rear perspective view of an interchangeable lens according to an example and a camera main body.

Hereinafter, an example of the present invention will be described with reference to the drawings. The same or corresponding portions in the drawings are denoted by the same reference signs. Further, although an interchangeable lens, which is an example of an optical apparatus, will be described in the present example, also for others such as a lens-integrated camera, the present invention can be changed and modified in various ways within the scope of the gist thereof

First Embodiment

Figure 1B:
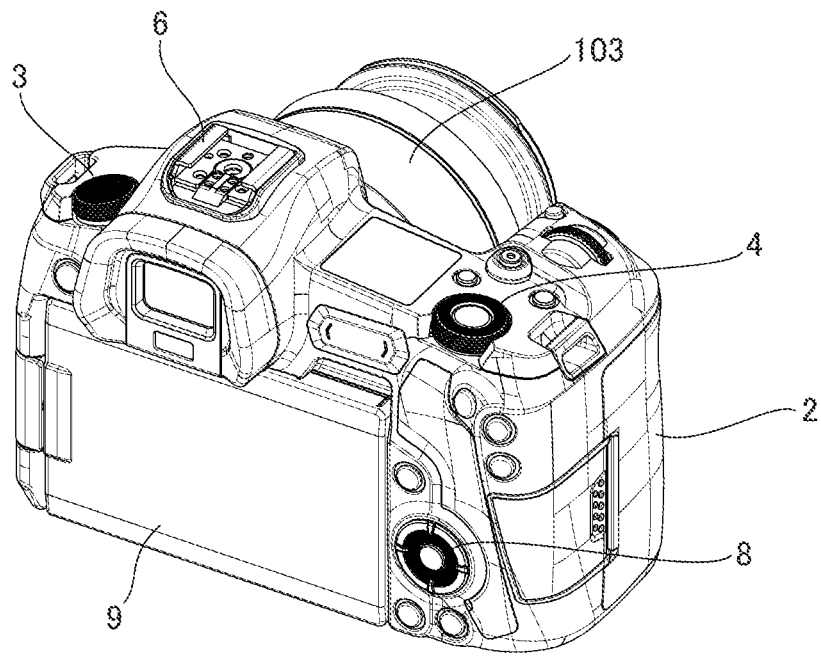

FIG. 1 illustrates an external appearance of an interchangeable lens (optical apparatus) 101 according to the present example and a camera (hereinafter referred to as a camera main body) 1 to which the interchangeable lens 101 is detachably attached. The camera main body 1 may be, for example, a digital camera. FIGS. 1A and 1B are perspective views illustrating a front surface side (object side) and a rear surface side (imaging surface side). In the present example, as illustrated in FIG. 1A, an optical axis direction, which is a direction in which an optical axis of an imaging optical system housed in the interchangeable lens 101 extends (direction along the optical axis), is referred to as an X-axis direction, and directions perpendicular thereto are referred to as a Z-axis direction (horizontal direction) and a Y-axis direction (vertical direction). Hereinafter, the Z-axis direction and the Y-axis direction are also collectively referred to as a Z/Y-axis direction. Also, a rotation direction around the Z axis is referred to as a pitch direction, and a rotation direction around the Y axis is referred to as a yaw direction. The pitch direction and the yaw direction (hereinafter, also collectively referred to as a pitch/yaw direction) are rotation directions around two axes which are the Z axis and the Y axis perpendicular to each other.

A grip part 2 for a user to grip the camera main body 1 by a hand is provided on a portion of the camera main body 1 illustrated in FIG. 1 on a left side when viewed from the front (right side as viewed from the rear). Also, a power operation unit 3 is disposed on an upper surface portion of the camera main body 1. If the user operates to turn on the power operation unit 3 while the camera main body 1 is in a power-off state, energization is started, the camera main body 1 enters a power-on state, a computer program such as origin detection processing of a focus group is executed, and an imaging standby state is set.

Further, even if the camera main body 1 is in a power-off state, a camera system thereof detects that the interchangeable lens 101 is mechanically and electrically connected, starts energization from the camera main body 1 to the interchangeable lens 101, and executes the origin detection processing of the focus group. In this case, if the user operates to turn off the power operation unit 3 while the camera main body 1 is in a power-on state, the camera main body 1 enters a power-off state.

Further, a mode dial 4 a release button 5, and an accessory shoe 6 are provided on an upper surface portion of the camera main body 1. When the user operates to rotate the mode dial 4, an image capturing mode can be switched. The image capturing mode includes a manual still image capturing mode in which the user can arbitrarily set imaging conditions such as a shutter speed, an aperture value, and the like, an auto still image capturing mode in which an appropriate exposure amount is automatically obtained, and a moving image capturing mode for capturing moving images. Also, the user can instruct an imaging preparation operation such as autofocus, automatic exposure control, or the like by operating the release button 5 to be half-pressed, and can instruct to capture an image by operating the release button 5 to be fully pressed. An accessory (camera accessory) of lighting or a light emitting device such as, for example, an external flash is detachably attached to the accessory shoe 6.

The interchangeable lens 101 includes a lens mount 102 that can be mechanically and electrically connected to a camera mount 7 provided on the camera main body 1. An imaging optical system that forms an object image by forming an image of light from the object is housed in the interchangeable lens 101. A zoom operation ring (operation member) 103 that is rotatable around the optical axis by a user operation is provided on an outer circumference of the interchangeable lens 101. When the zoom operation ring 103 is operated to rotate by the user, a zoom group constituting the imaging optical system moves to a predetermined use position corresponding to an angle of the zoom operation ring 103 in a range from a wide-angle end to a telephoto end. In this way, the user can capture an image at a desired angle of view. Also, as will be described in detail later, in the present example, a retracted end in which imaging is restricted is further provided after the zoom operation ring 103 is operated to rotate from the telephoto end to the wide-angle end. The retracted end is a position at which the interchangeable lens 101 is retracted most.

As illustrated in FIG. 1B, a rear surface operation unit 8 and a display unit 9 are provided on a rear surface of the camera main body 1. The rear surface operation unit 8 includes a plurality of buttons and dials to which various functions are assigned. When the camera main body 1 is in a power-on state and a still image or moving image capturing mode is set, a through image of the object image captured by an image sensor element to be described later is displayed on the display unit 9. Also, imaging parameters indicating imaging conditions such as a shutter speed, an aperture value, and the like are displayed on the display unit 9, and the user can change set values of the imaging parameters by operating the rear surface operation unit 8 while viewing the display. The rear surface operation unit 8 includes a play button for instructing play of a recorded captured image, and the captured image is played and displayed on the display unit 9 by the user operating the play button. Further, the display unit 9 may be configured as a touch panel type to have the same function as the rear surface operation unit 8.

Figure 2:
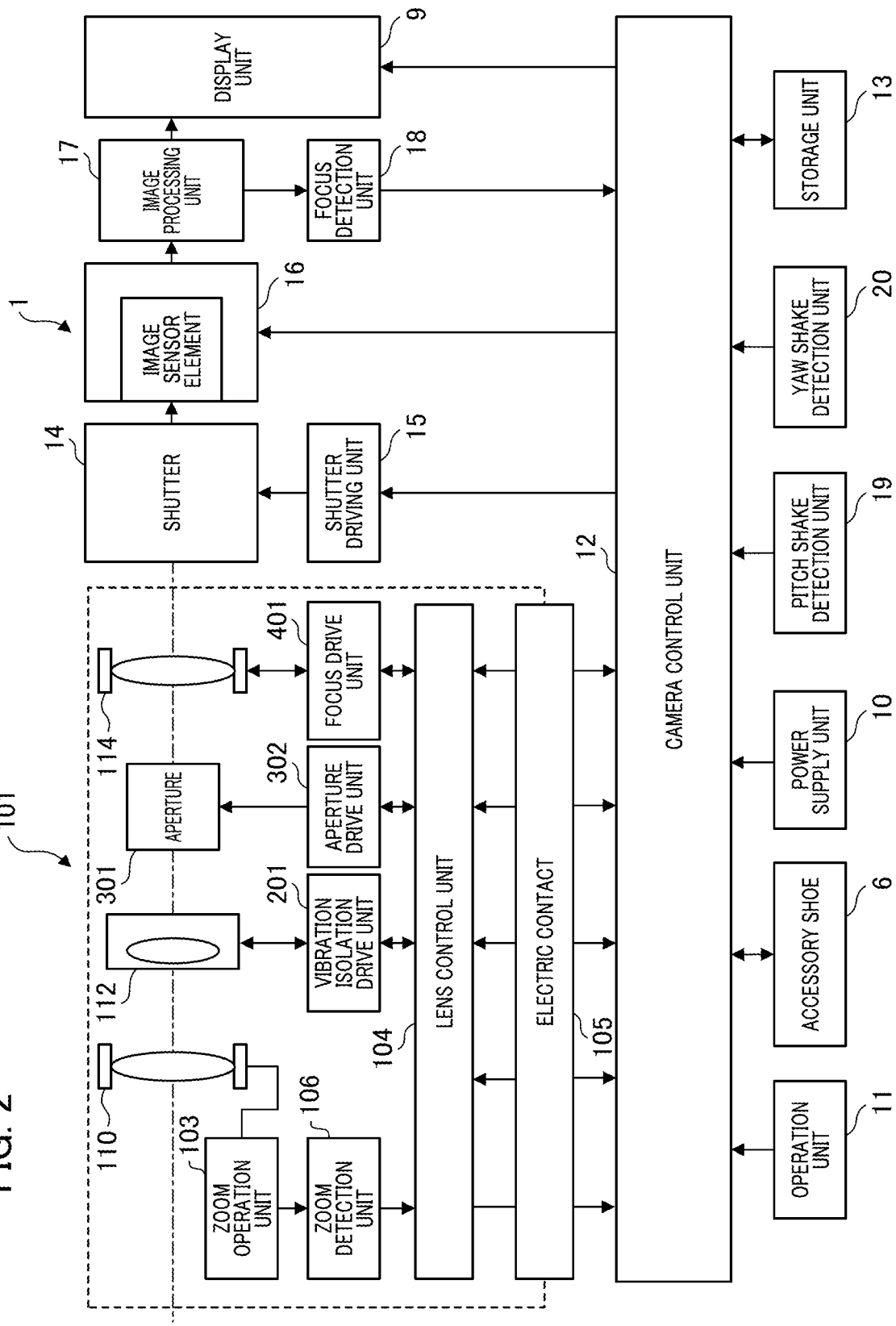
FIG. 2 is a block diagram showing a configuration of the interchangeable lens and the camera main body according to the example.

FIG. 2 is a block diagram illustrating an electrical and optical configuration of the interchangeable lens 101 and the camera main body 1. The camera main body 1 includes a power supply unit 10 that supplies power to the camera main body 1 and the interchangeable lens 101, and an operation unit 11 including the power operation unit 3, the mode dial 4, the release button 5, the rear surface operation unit 8, and a touch panel function of the display unit 9 which have been described above. Control of the camera main body 1 and the interchangeable lens 101 as a whole system in the present example is performed by a camera control unit 12 provided in the camera main body 1 and a lens control unit 104 provided in the interchangeable lens 101 cooperating with each other. Further, computers for controlling the camera main body 1 and the interchangeable lens 101 are incorporated in the camera control unit 12 and the lens control unit 104, and the entire system of the camera main body 1 and the interchangeable lens 101 is controlled by operating the two in cooperation with each other.

The camera control unit 12 reads and executes a computer program stored in a storage unit 13. At that time, the camera control unit 12 performs communication of such as control signals and data of various types with the lens control unit 104 via a communication terminal of an electric contact 105 provided on the lens mount 102. The electric contact 105 includes a power supply terminal that supplies power from the power supply unit 10 described above to the interchangeable lens 101.

The imaging optical system of the interchangeable lens 101 includes zoom groups 110 connected to the zoom operation ring 103 and moving in the optical axis direction to change an angle of view, and a lens vibration isolation group 112 that includes a shift lens as a vibration isolation element. The lens vibration isolation group 112 reduces an image shake by moving (shifting) in the Z/Y axis direction perpendicular to the optical axis. Also, the imaging optical system includes an aperture group 301 that performs a light amount adjusting operation, and a focus group 114 having a focus lens that moves in the optical axis direction to perform focus adjustment (focusing). Further, the interchangeable lens 101 includes a vibration isolation driving unit 201 that moves the lens vibration isolation group 112, an aperture driving unit 302 that drives the aperture group 301, and a focus driving unit 401 that moves the focus group 114.

The camera main body 1 includes a display unit 9, a shutter unit 14, a shutter driving unit 15, an image sensor element 16, an image processing unit 17, and the above-described camera control unit 12. The shutter unit 14 controls an amount of light that is image-formed by the imaging optical system in the interchangeable lens 101 and exposed in the image sensor element 16. The image sensor element 16 photoelectrically converts an object image formed by the imaging optical system and outputs a captured image signal. The image processing unit 17 performs image processing of various types on the captured image signal and then generates an image signal. The display unit 9 displays the image signal (through image) output from the image processing unit 17, displays imaging parameters as described above, and plays and displays the captured image recorded in the storage unit 13 or a recording medium (not illustrated).

The camera control unit 12 controls the focus driving unit 401 according to an imaging preparation operation (for example, a half-press operation of the release button S or the like) in the operation unit 11. For example, if an autofocus operation is instructed, a focus detection unit 18 determines a focus state of the object image formed by the image sensor element 16 on the basis of the image signal generated by the image processing unit 17, and generates a focus signal for transmission to the camera control unit 12. At the same time, the focus driving unit 401 transmits information on a current position of the focus group 114 to the camera control unit 12. The camera control unit 12 compares the focus state of the object image with the current position of the focus group 114, and calculates a drive amount for focusing from an amount of deviation therebetween for transmission to the lens control unit 104. Then, the lens control unit 104 moves the focus group 114 to a target position in the optical axis direction via the focus driving unit 401, and corrects a defocus of the object image.

As will be described in detail later, the focus driving unit 401 includes a focus motor 401a that functions as an actuator and a photo-interrupter 148 that detects an origin position of the focus group 114. In the present example, the photo-interrupter 148 functions as a detection unit. Generally, as the focus motor, a stepping motor, which is a type of actuator, is often employed. However, since the stepping motor can control only a relative drive amount, a current position of the focus group 114 is undefined in a power-off state of the camera main body 1. In this case, a current position of the focus group 114 cannot be detected.

Also, even if the camera main body 1 remains in a power-on state, a case in which energization to the interchangeable lens 101 is interrupted due to mechanical removal of the interchangeable lens 101 from the camera mount 7 of the camera main body 1 or the like may be assumed. In this case, the focus group 114 remains held at the position at the time of the energization interruption, and detection is not possible.

If the user operates to turn on the power operation unit 3 from such a state in which the current position of the focus group 114 is undefined, the focus group 114 has to be moved to the origin position temporarily to execute origin detection processing first before reaching the imaging standby state.

Further, as the focus motor 401a a DC motor or an ultrasonic motor having an encoder, a servo motor, or the like may be employed. Also, the photo-interrupter 148 directly receives light emitted from a light emitting part by a light receiving unit, but instead of this, a photo-reflector that receives reflected light from a reflecting surface or a brush that comes into contact with a conductive pattern to electrically detect a signal may also be used as the detection unit.

Also, the camera control unit 12 controls driving of the aperture group 301 and the shutter unit 14 via the aperture driving unit 302 and the shutter driving unit 15 according to set values of an aperture value and a shutter speed received from the operation unit 11. For example, when an operation of the automatic exposure control is instructed, the camera control unit 12 receives a luminance signal generated by the image processing unit 17 and performs a photometric calculation. On the basis of a result of this photometric calculation, the camera control unit 12 controls the aperture driving unit 302 according to an operation of an imaging instruction (such as a full-press operation of the release button 5) in the operation unit 11. At the same time, the camera control unit 12 controls driving of the shutter unit 14 via the shutter driving unit 15 and performs exposure processing by the image sensor element 16.

The camera main body 1 includes a pitch shake detection unit 19 and a yaw shake detection unit 20 as units configured to detect a shake capable of detecting an image shake due to a camera shake of the user or the like. The pitch shake detection unit 19 and the yaw shake detection unit 20 detect image shakes in a pitch direction (rotation direction around the Z axis) and a yaw direction (rotation direction around the Y axis) using an angular velocity sensor (vibrational gyroscope) and an angular acceleration sensor, and output shake signals.

The camera control unit 12 calculates a shift position of the lens vibration isolation group 112 in the Y-axis direction using the shake signal from the pitch shake detection unit 19. Similarly, the camera control unit 12 calculates a shift position of the lens vibration isolation group 112 in the Z-axis direction using the shake signal from the yaw shake detection unit 20. Then, the camera control unit 12 moves the lens vibration isolation group 112 to a target position in the Z/Y-axis direction via the vibration isolation driving unit 201 according to the calculated shift position in the pitch/yaw direction to reduce an image shake during an exposure or a through image display.

The interchangeable lens 101 includes the zoom operation ring 103 for changing an angle of view of the imaging optical system, and a zoom detection unit 106 for detecting an angle of the zoom operation ring 103. The zoom detection unit 106 detects an angle of the zoom operation ring 103 operated by the user as an absolute value and is configured by using, for example, a resistance type linear potentiometer. Information on the angle of view detected by the zoom detection unit 106 is transmitted to the lens control unit 104 to be reflected in controls of various types by the camera control unit 12 described above. On the other hand, some of such information of various types is recorded in the storage unit 13 or a recording medium (not illustrated) together with the captured image.

Figure 3:
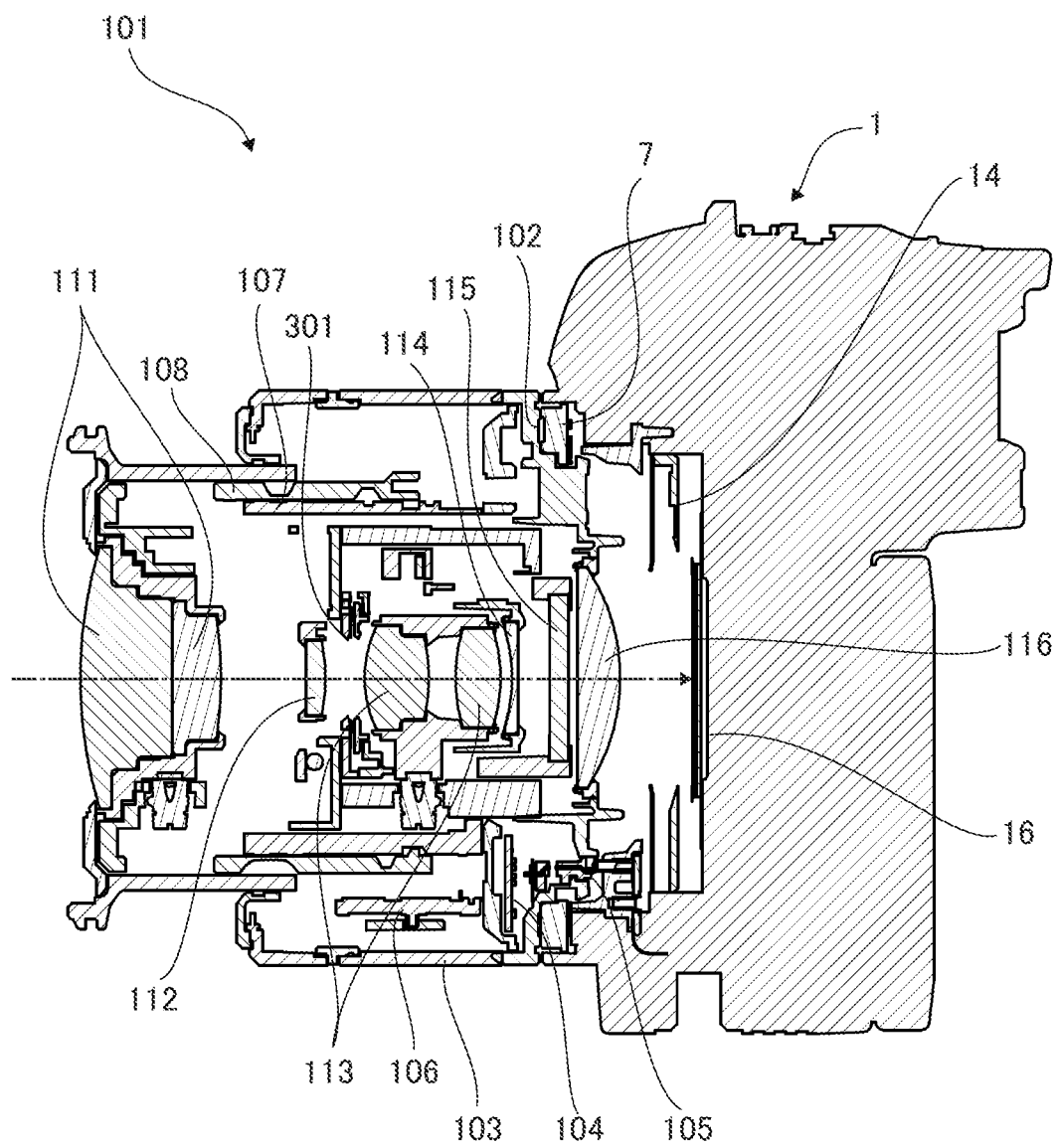
FIG. 3 is a cross-sectional view of the interchangeable lens (wide-angle end at the time of imaging) according to the example.
Figure 4:
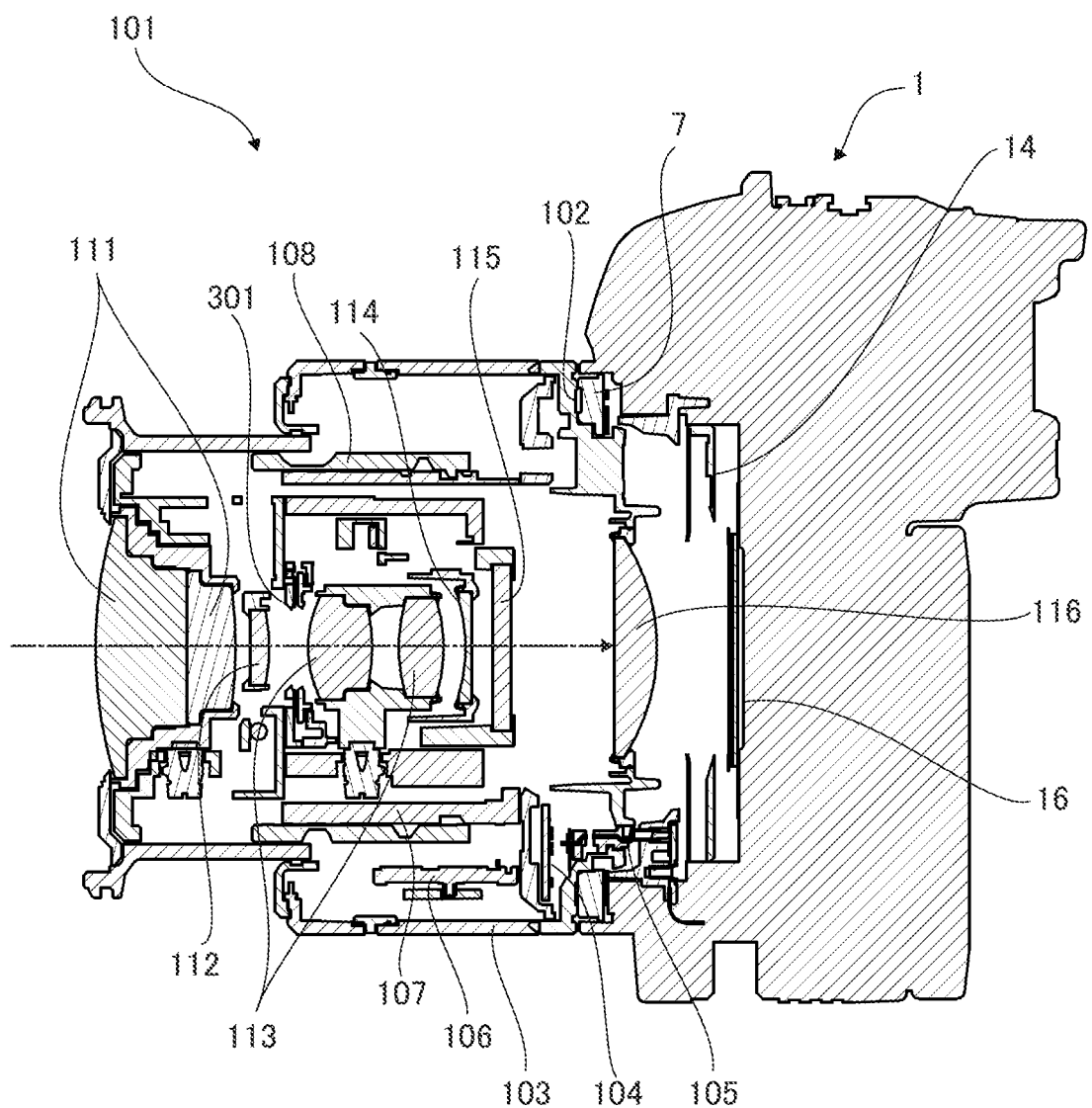
FIG. 4 is a cross-sectional view of the interchangeable lens (telephoto end at the time of imaging) according to the example.
Figure 5:
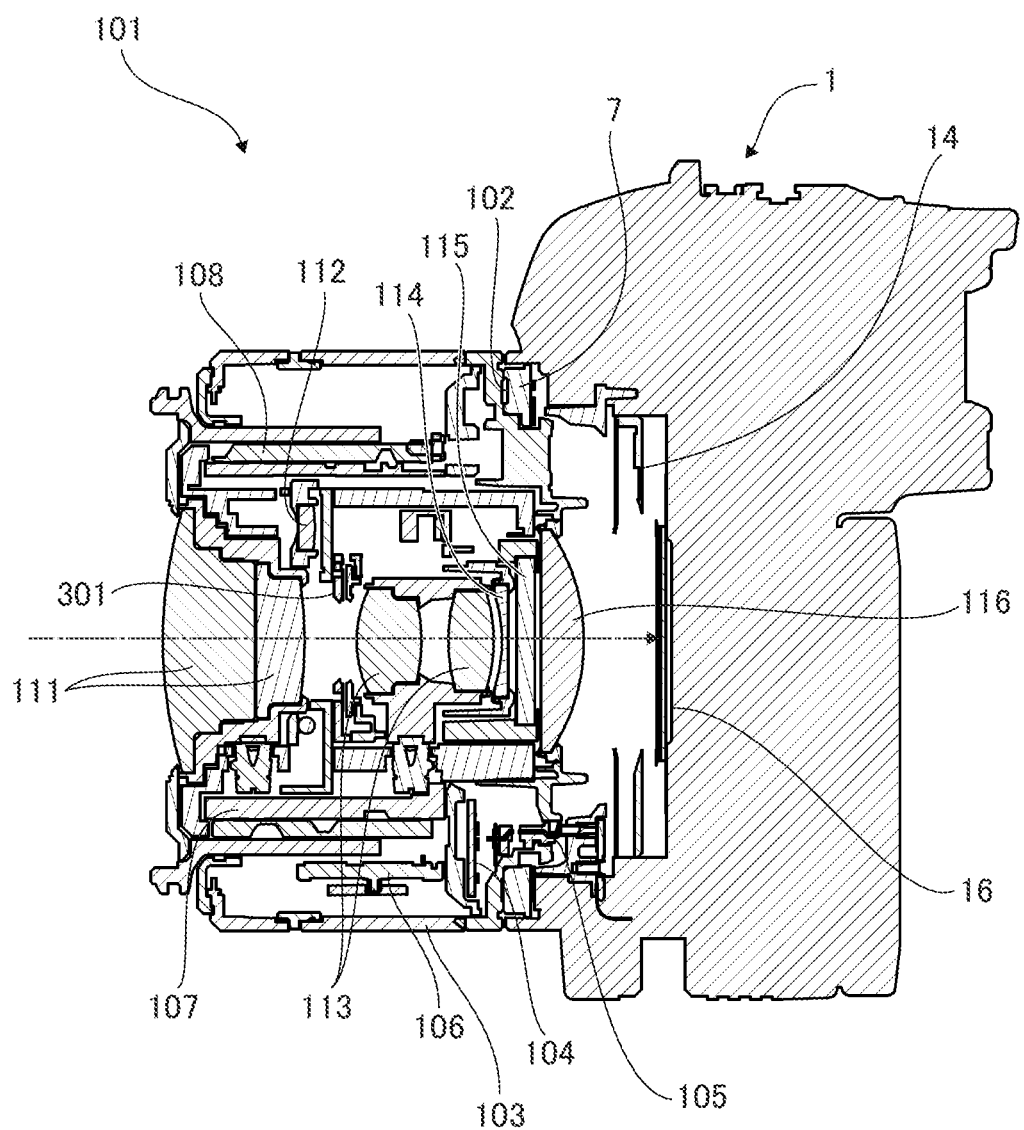
FIG. 5 is a cross-sectional view of the interchangeable lens (retracted end at the time of non-imaging) according to the example.

Next, a positional relationship of main components in the interchangeable lens 101 will be described with reference to FIGS. 3, 4, and 5. FIGS. 3, 4, and 5 are cross-sectional views on an XY plane including an optical axis, and since a center line illustrated here substantially coincides with the optical axis determined by the imaging optical system, the center line hereinafter has the same meaning as the optical axis. FIG. 3 is a view illustrating a wide-angle end on a short focal length side in zooming. FIG. 4 is a view illustrating a telephoto end on a long focal length side in zooming.

Both FIGS. 3 and 4 illustrate a state in which the imaging optical system of the interchangeable lens 101 is at a position at which imaging is possible (a state in which imaging is possible). On the other hand, FIG. 5 illustrates that the imaging optical system of the interchangeable lens 101 at the time of non-imaging is in a stored state (state in a retracted position). Also, FIG. 5 illustrates a retracted end in which the entire length in the optical axis direction is reduced most.

The retracted end illustrated in FIG. 5 is provided further ahead of the wide-angle end illustrated in FIG. 3, and a shift is made in order from the retracted end illustrated in FIG. 5 to the wide-angle end illustrated in FIG. 3 and then from the wide-angle end illustrated in FIG. 3 to the telephoto end illustrated in FIG. 4 by an operation of rotating the zoom operation ring 103 in one direction. In the present example, a state in which the imaging optical system is possible is referred to as a first state, and a state in which the imaging optical system is in the retracted position is referred to as a second state. Further, a state in which imaging is possible means that functions as a camera including the camera main body 1 and the interchangeable lens 101 can operate normally at any time. "Imaging being restricted" means that some of functions as a camera including the camera main body 1 and the interchangeable lens 101 do not operate normally. For example, when the imaging optical system is in the retracted position, an imaging action itself (for example, pressing the shutter to image an object) is possible. However, it is conceivable that an image may be blurred in whole or in part due to an event such as a captured image being out of focus.

As illustrated in FIGS. 3 and 4, in the present example, a six-group configuration is employed as an example of the imaging optical system. The zoom groups 110 move to predetermined use positions that are different at the wide-angle end and the telephoto end, and form an image of light from the object on the image sensor element 16. The zoom groups 110 are constituted by a first zoom group 111, the lens vibration isolation group 112 that functions as a second zoom group, the aperture group 301, a third zoom group 113, the focus group 114 that functions as a fourth zoom group, a fifth zoom group 115, and a sixth zoom group 116. Further, the present example does not limit a configuration of the imaging optical system, and for example, the lens vibration isolation group 112 and the focus group 114 may function as other zoom groups. Also, some of the lens groups may not be movable and may be fixed.

A straight movement guide barrel 107 is a fixed component fixed to the lens mount 102 via a fixed barrel (not illustrated). Cam grooves (not illustrated) are formed at equally divided positions on an outer circumferential surface of the straight movement guide barrel 107. On the other hand, cam followers (not illustrated) are provided on an inner circumferential side of a cam barrel 108. Further, the cam barrel 108 is connected to the zoom operation ring 103 via a key (not illustrated). When the zoom operation ring 103 is operated to rotate, the cam barrel 108 moves back and forth in the optical axis direction while rotating around the optical axis due to fitting of the cam groove and the cam follower.

Straight movement guide grooves that restrict movement of the zoom groups 110 in a rotation direction and guide straight movement in the optical axis direction are formed on the straight movement guide barrel 107 at equally divided positions. Also, cam grooves having trajectories of different angles in the rotation direction corresponding to the zoom groups 110 are formed on the cam barrel 108 at equally divided positions. On the other hand, a plurality of cam followers are provided in the zoom groups 110, and the cam followers are fitted to the corresponding straight movement guide grooves and cam grooves. When the user operates to rotate the zoom operation ring 103, the cam barrel 108 rotates, and the cam followers move the zoom groups 110 back and forth in the optical axis direction while restricting movement in the rotation direction due to fitting of the straight movement guide grooves and the cam grooves.

The interchangeable lens 101 of the present example has a retractable mechanism to be described in detail later, and a retreat mechanism of the lens vibration isolation group (second zoom group) 112. Thereby, the zoom groups 110 can be further retracted to the rear surface side (imaging surface side) at the time of non-imaging. Thereby, reduction in the entire length of the interchangeable lens 101 can be realized, and portability of the interchangeable lens 101 and the camera main body 1 can be enhanced.

A distance between the first zoom group 111 and the lens vibration isolation group (second zoom group) 112 is large at the wide-angle end illustrated in FIG. 3, and a distance between the fifth zoom group 115 and the sixth zoom group 116 is large at the telephoto end illustrated in FIG. 4. The retractable mechanism reduces the entire length in the optical axis direction by reducing such distances and moving the zoom groups 110 to stored positions close to each other. As illustrated in FIG. 5, the zoom groups 110 have moved to the stored positions close to each other at the retracted end at the time of non-imaging. From this state, for example, if the user operates to rotate the zoom operation ring 103 to the wide-angle end, the zoom groups 110 extend to the front surface side (object side), move to predetermined use positions, and reach a state in which imaging is possible as illustrated in FIG. 3.

Also, at the time of imaging as illustrated in FIGS. 3 and 4, all the zoom groups 110 are disposed on the same optical axis, but at the retracted end at the time of non-imaging illustrated in FIG. 5, the lens vibration isolation group (second zoom group) 112 has retreated in a direction (radial direction) perpendicular to the optical axis. When the user operates to rotate the zoom operation ring 103 toward the retracted end from the wide-angle end in which imaging is possible as illustrated in FIG. 3, the zoom groups 110 start to retract to the rear surface side (imaging surface side), but at the same time, the lens vibration isolation group (second zoom group) 112 retreats from the optical axis. The first zoom group 111 is further retracted into a space created in this way and is stored not to interfere with each other, and thus the entire length reaches a state in which it is reduced most as illustrated in FIG. 5. Since such a retreat mechanism of the lens vibration isolation group (second zoom group) 112 is a known technology that has been employed in many optical apparatuses, description thereof will be omitted.

Figure 6A:
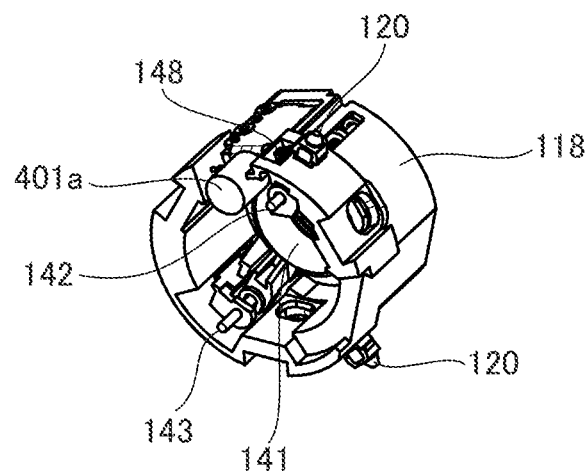
FIGS. 6A and 6B are a perspective view and an exploded perspective view of a retractable mechanism according to the example.
Figure 6B:
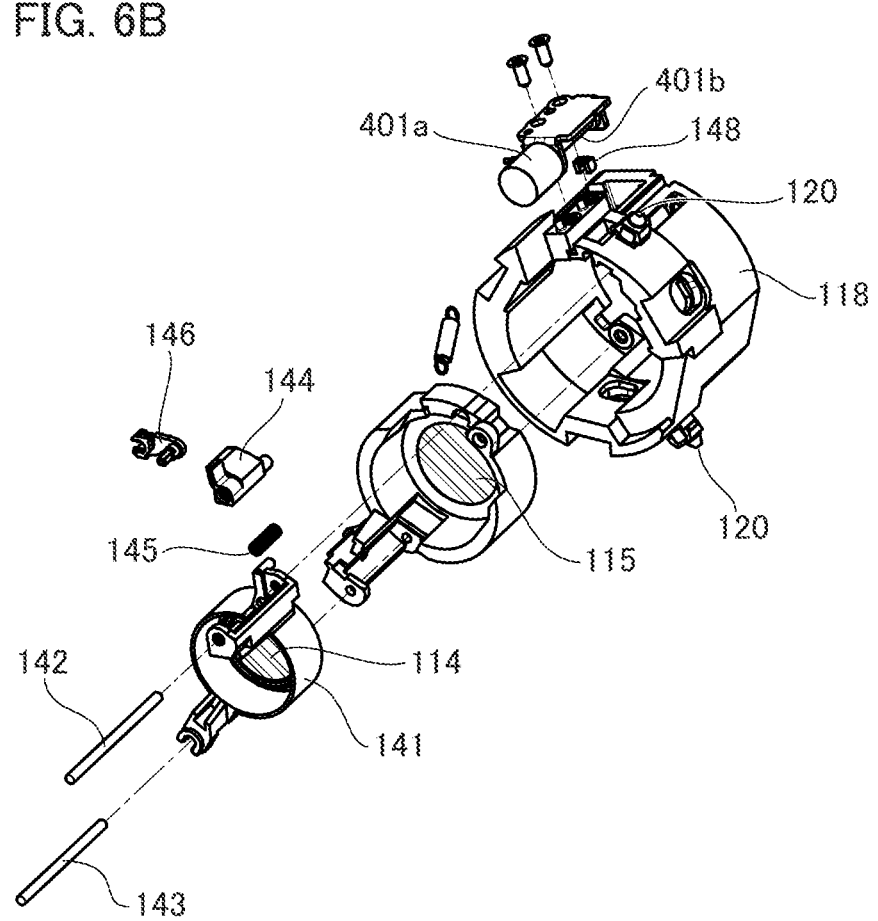
Figure 7:
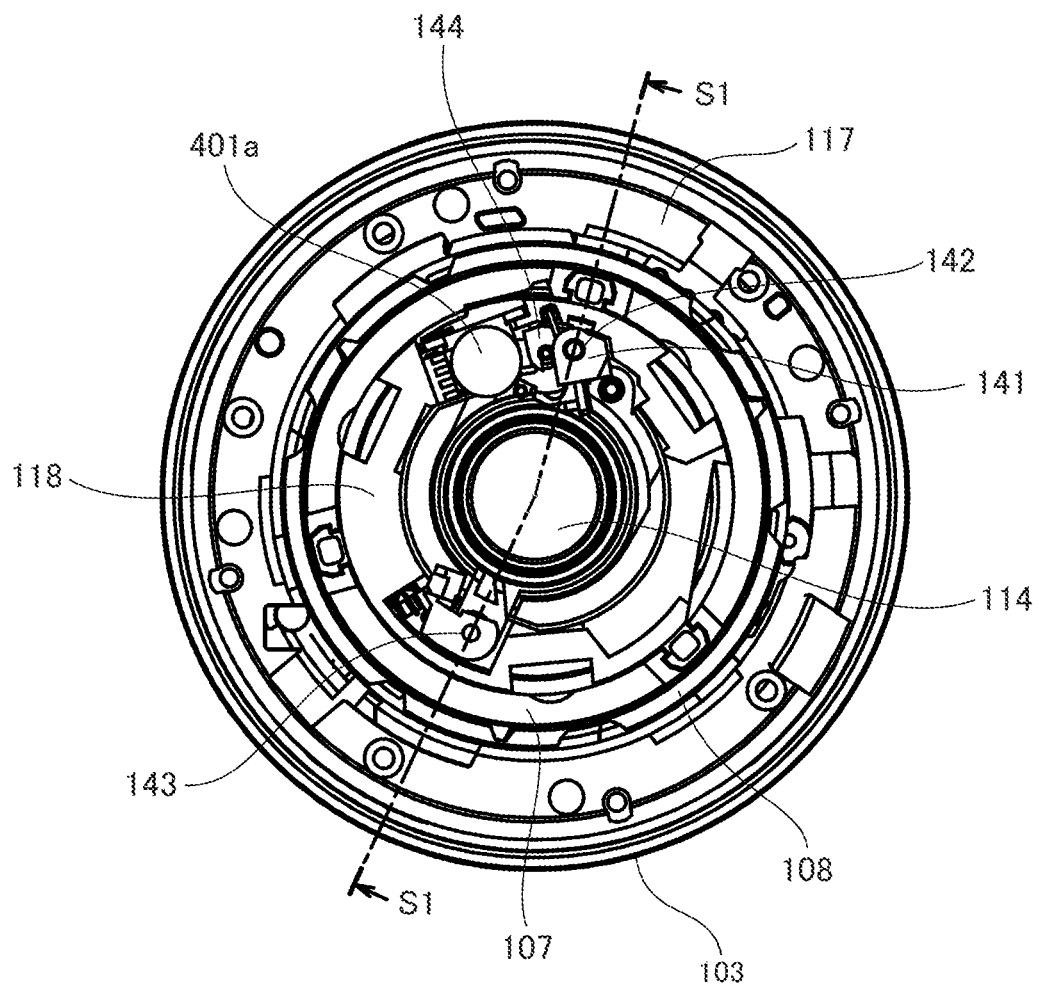
FIG. 7 is a front view of the retractable mechanism according to the example.
Figure 8:
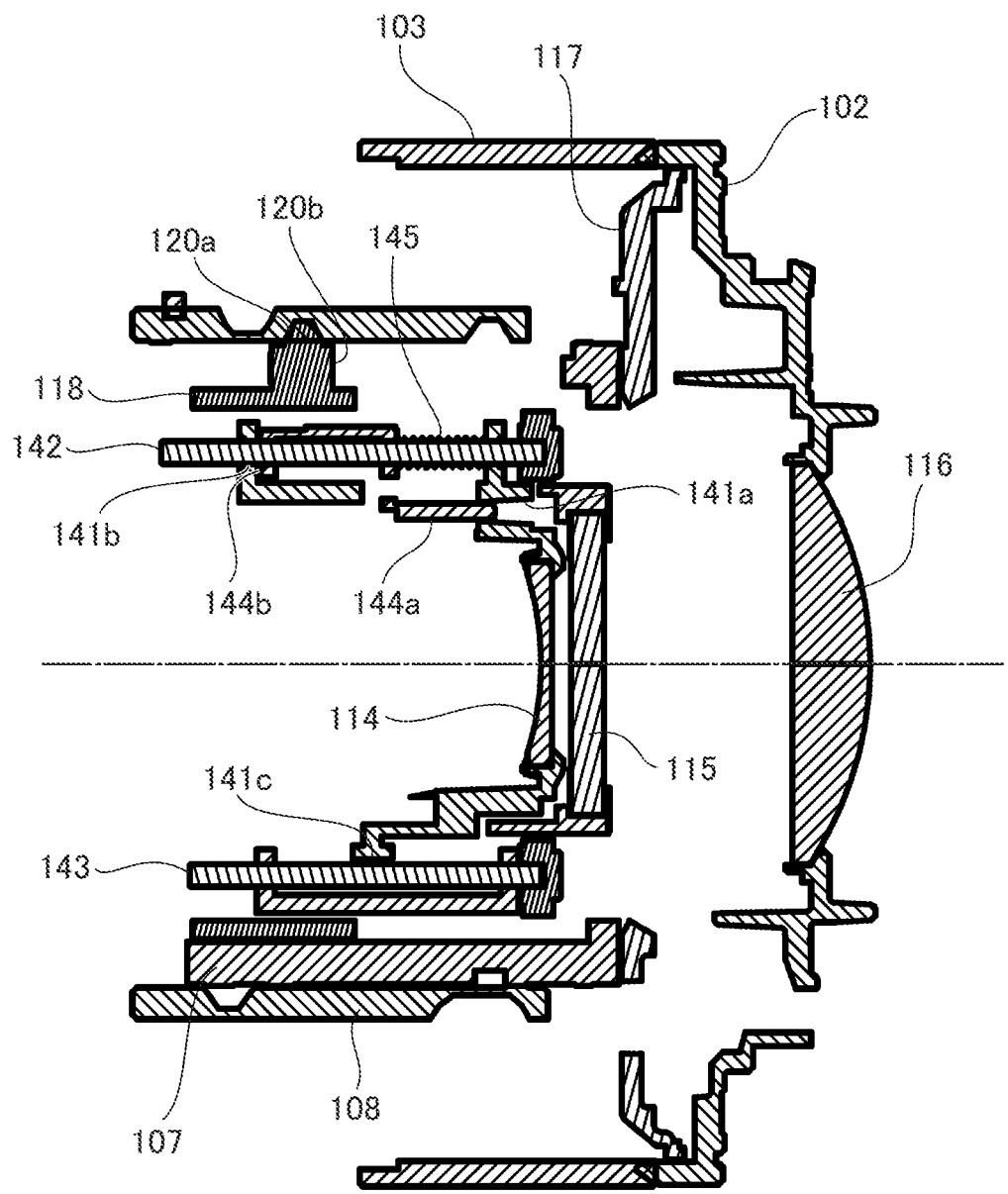
FIG. 8 is a cross-sectional view illustrating a state close to the telephoto end of the retractable mechanism according to the example.
Figure 9:
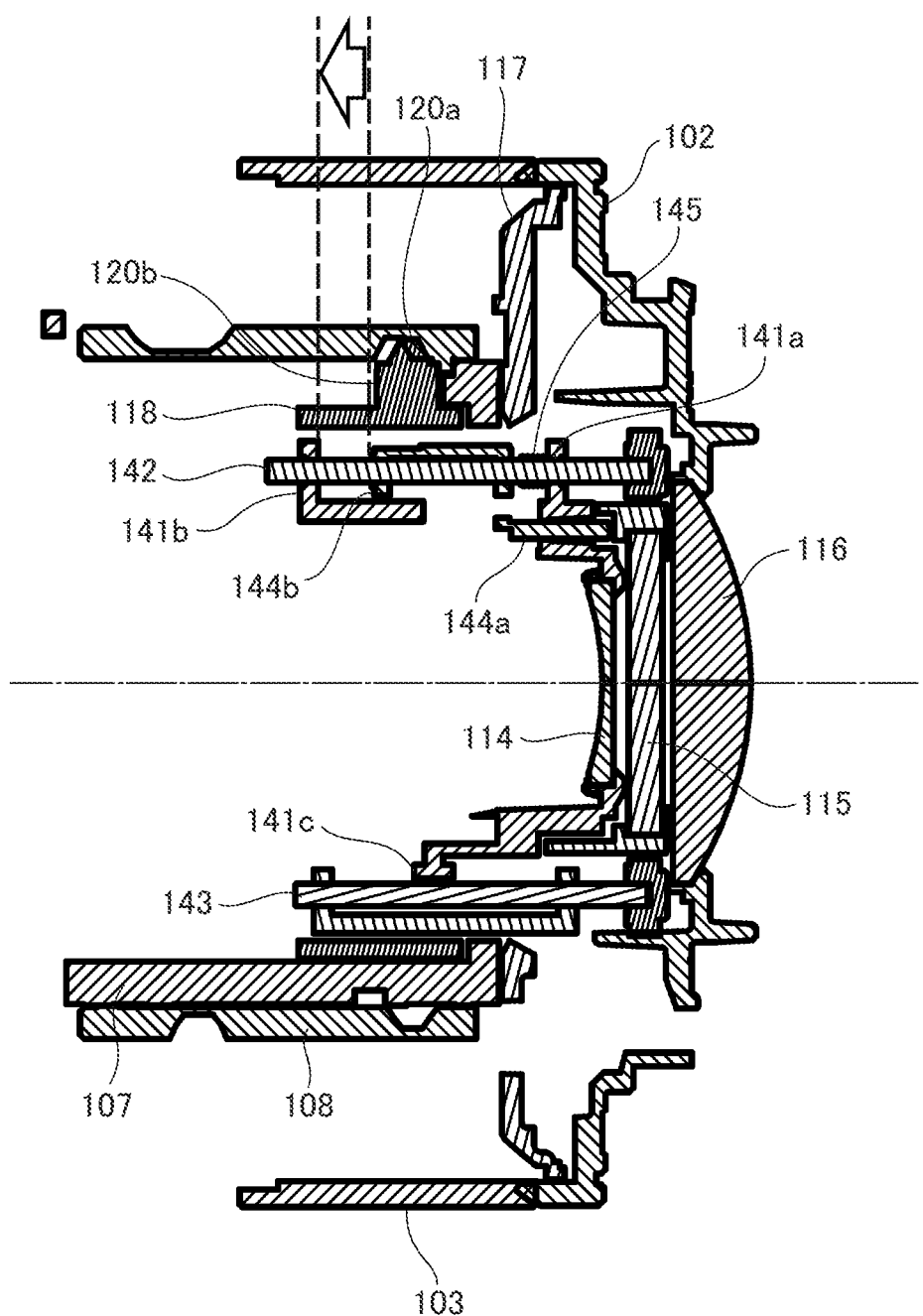
FIG. 9 is a cross-sectional view illustrating the retracted end of the retractable mechanism according to the example.

FIG. 6A is a perspective view illustrating the retractable mechanism in the present example. FIG. 6A is a perspective view of a member (component) constituting the retractable mechanism of the present example, and FIG. 6B is an exploded perspective view illustrating a part of the component illustrated in FIG. 6A in an exploded manner. Also, FIG. 7 is a front view of the retractable mechanism in the present example. FIGS. 8 and 9 are cross-sectional views illustrating a cross section along line S1-S1 in FIG. 7. FIG. 8 illustrates the telephoto end of the same interchangeable lens 101 as in FIG. 4. FIG. 9 illustrates the retracted end of the same interchangeable lens 101 as in FIG. 5.

In FIGS. 6 to 9, a rear group base barrel 118 stores the focus driving unit 401 including the focus motor 401a and a feed screw (meshing part) 401b, a focus group holding frame 141 for holding the focus group 114, the fifth zoom group 115, and the like. Then, when zooming from the wide-angle end to the telephoto end, the retractable mechanism moves integrally with these components in the optical axis direction. Three cam followers 120 are provided on an outer circumference of the rear group base barrel 118 at equally divided positions.

The cam followers 120 are engaged with tapered inner circumferential cam grooves provided on the inner circumference of the cam barrel 108, and a cam barrel engaging part 120a of each of the cam followers 120 has a conical shape and is configured to be in contact (for example, in line contact) with an inclined surface of each of the inner circumferential cam grooves. Also, a guide barrel engaging part 120b of the cam follower 120 is engaged with the straight movement guide groove provided on the straight movement guide barrel 107. When the zoom operation ring 103 is operated to rotate, the cam barrel 108 connected by a key (not illustrated) rotationally moves, and the rear group base barrel 118 moves in conjunction with the zoom operation ring 103. In this way, when the rear group base barrel 118 moves in the optical axis direction, the first state in which imaging is possible as illustrated in FIG. 8 shifts to the second state in which movement of the focus group holding frame 141 illustrated in FIG. 9 is restricted and imaging is restricted.

Figure 10:
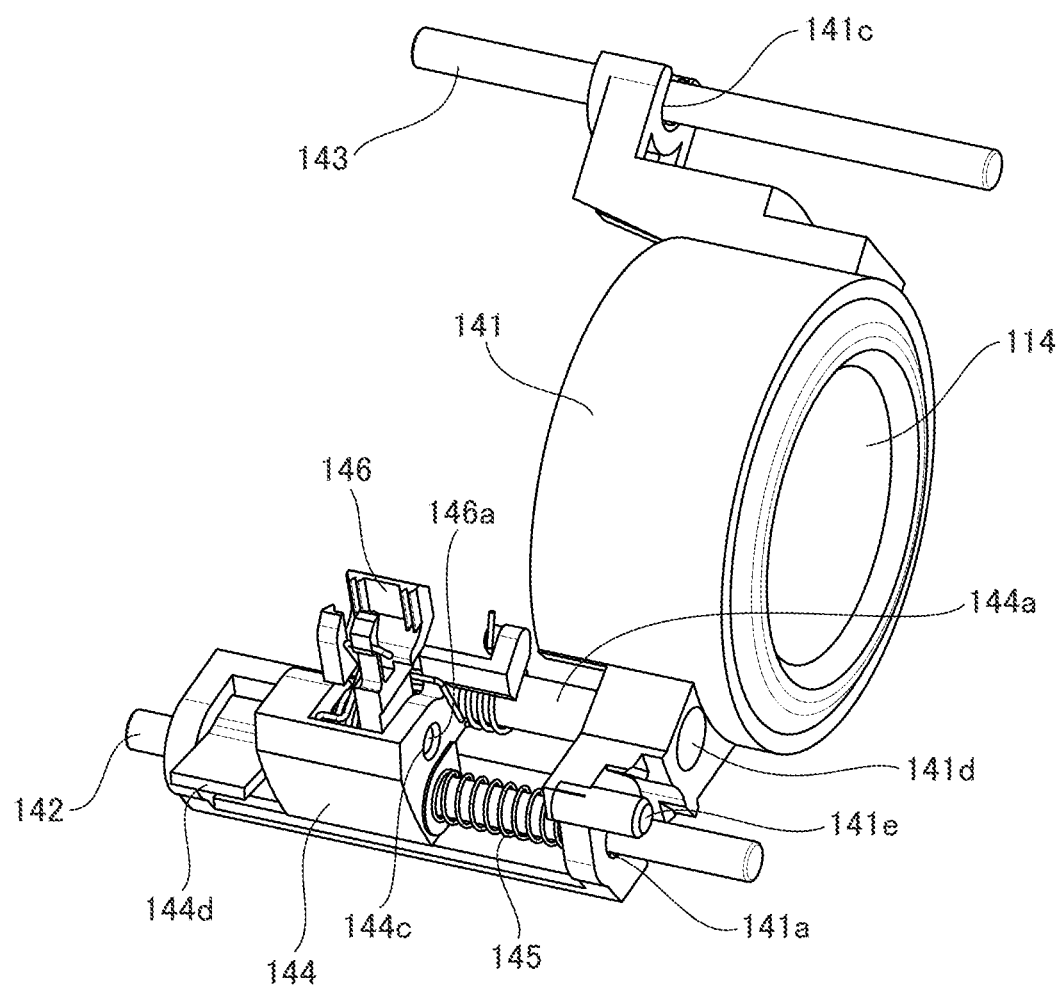
FIG. 10 is a perspective view illustrating a holding structure of a focus group at the telephoto end according to the example.
Figure 11:
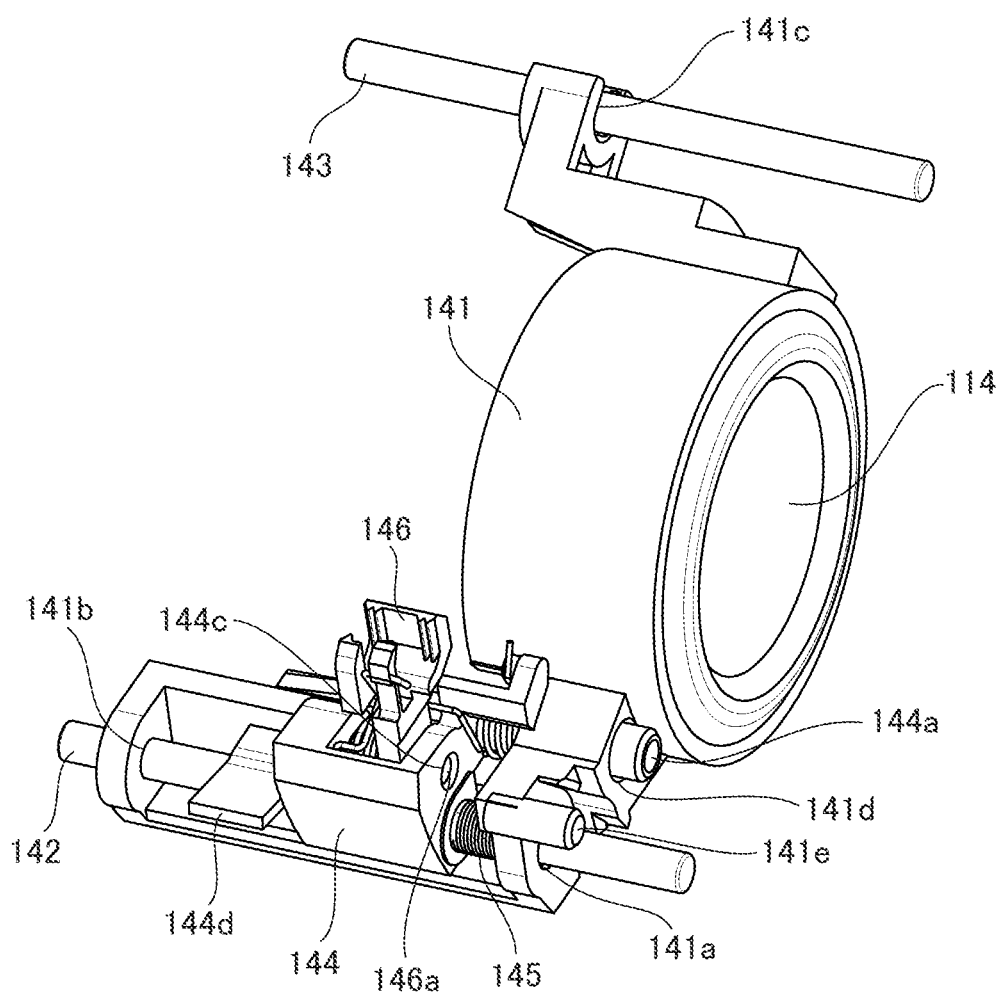
FIG. 11 is a perspective view illustrating a holding structure of the focus group at the retracted end according to the embodiment.

FIGS. 10 and 11 are perspective views illustrating a holding structure of the focus group 114. FIG. 10 illustrates the same telephoto end as in FIGS. 4 and 8, and FIG. 11 illustrates the same retracted end as in FIGS. 5 and 9. A first guide bar 142 is a metal member fixed to the rear group base barrel 118, and is engaged with a sliding hole 141a on the imaging surface side and a sliding hole 141b on the object side formed in the focus group holding frame 141. Similarly, a second guide bar 143 fixed to the rear group base barrel 118 is engaged with the U-shaped groove 141c provided in the focus group holding frame 141. Thereby, the focus group holding frame 141 is held to be movable in the optical axis direction with respect to the rear group base barrel 118.

In the present example, a rack holder (second intermediate member) 144 and a rack (first intermediate member) 146 are configured as intermediate members. The rack holder 144 has a through hole into which the first guide bar 142 is inserted. The rack holder 144 is held to be movable in an axial direction of the first guide bar 142 and is prevented from rotating around the through hole by a boss 144a engaged with an elongated hole 141d provided in the focus group holding frame 141. A compression coil spring (biasing member) 145 is disposed in a space between the focus group holding frame 141 and the rack holder 144. Then, one end of the compression coil spring 145 biases the focus group holding frame 141 to the imaging surface side in the optical axis direction, and similarly, the other end thereof biases the rack holder 144 to the sliding hole 141b side (object side) of the focus group holding frame 141.

The rack 146 meshes with the feed screw 401b of the focus driving unit 401 and is allowed to rotate only around a fitting hole 144c due to a rotating shaft part 146a engaged with the fitting hole 144c of the rack holder 144. Thereby, even if the feed screw 401b shakes due to variations in component accuracy, a rotational driving force of the focus motor 401a can be stably converted into a propulsive force in the optical axis direction. Also, the rack holder 144 fixes the rack 146. Therefore, if the rack holder 144 moves in the optical axis direction, the rack 146 integrally moves (in conjunction with) in the same direction.

Figure 12:
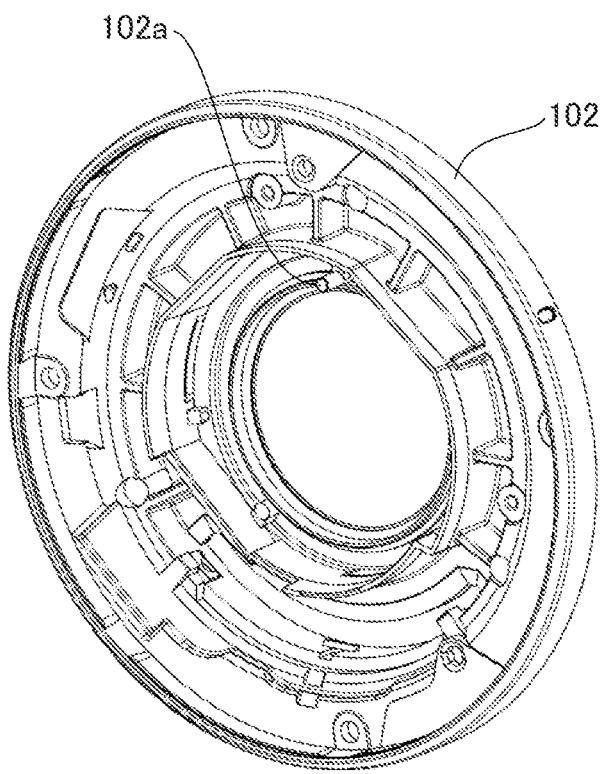
FIG. 12 is a front perspective view of a lens mount according to the example.

FIG. 12 is a perspective view of the lens mount 102 from the object side. Further, FIG. 12 illustrates a location of a contact part 102a that abuts on a contact part 141e of the focus group holding frame 141 at the time of retracting. At the telephoto end illustrated in FIG. 10, an end portion 144b and the sliding hole 141b on the object side are in contact with each other due to the biasing force of the compression coil spring 145, and the rack holder 144 and the focus group holding frame 141 move integrally.

On the other hand, at the retracted end illustrated in FIG. 11, the rear group base barrel 118 moves to the imaging surface side opposite to the object side in the optical axis direction, and thereby the contact part 141e provided on the focus group holding frame 141 abuts on the contact part 102a provided on the lens mount 102 serving as a fixing member. Then, since the rack 146 is meshed with the feed screw 401b and does not move, the focus group holding frame 141 can be moved with respect to the rear group base barrel 118 by contracting the compression coil spring 145. At this time, the focus group holding frame 141 can be separated from the rack holder 144 against the biasing force of the compression coil spring 145. When the focus group holding frame 141 is separated from the rack holder 144, the first state shifts to the second state.

Figure 13:
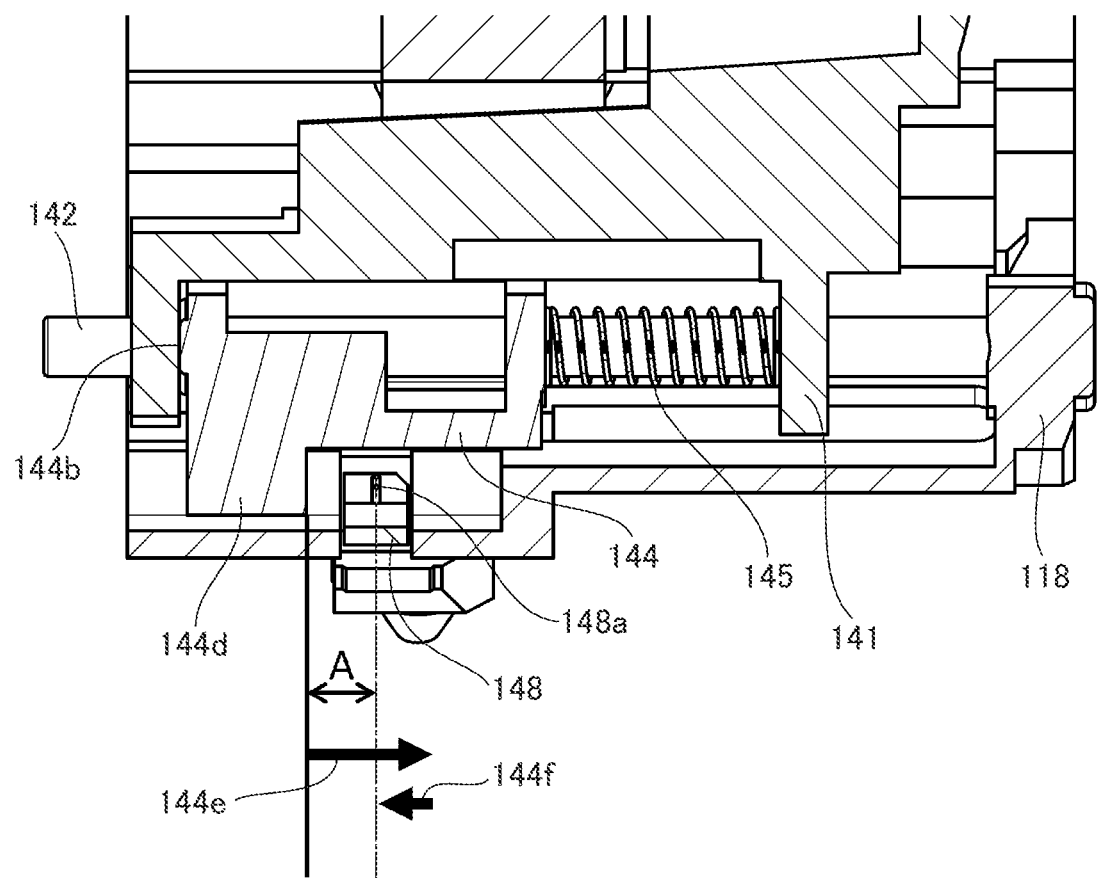
FIG. 13 is a cross-sectional view in which the focus group at the wide-angle end is moved to the retracted end according to the example.
Figure 14:
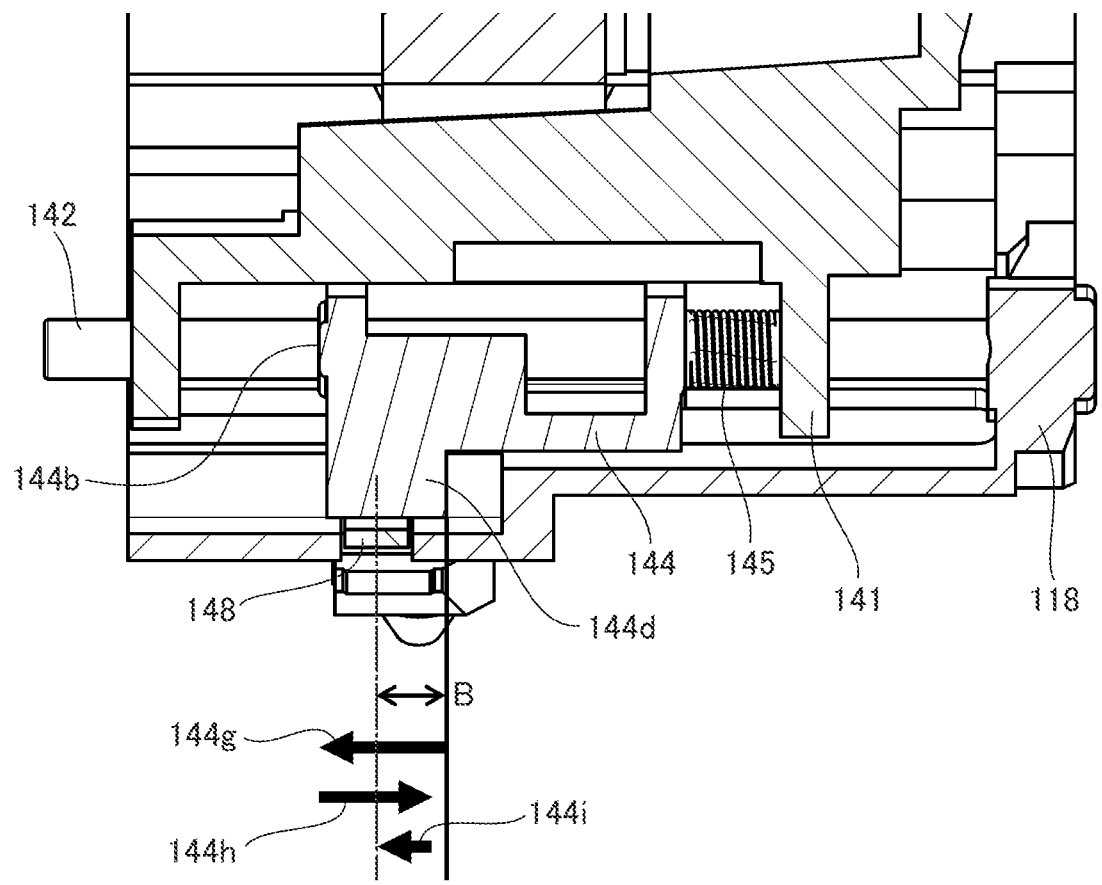
FIG. 14 is a cross-sectional view in which the focus group at the telephoto end is moved to the retracted end according to the example.

Next, origin position detection of the focus group holding frame 141 will be described using FIGS. 13 and 14. FIG. 13 is a cross-sectional view in the vicinity of the photointerrupter 148 in a case in which a position of the focus group holding frame 141 at the wide-angle end illustrated in FIG. 3 remains as it is in the retracted state. FIG. 14 is a cross-sectional view in a case in which a position of the focus group holding frame 141 at the telephoto end illustrated in FIGS. 4 and 8 remains as it is in the retracted state.

As illustrated in FIGS. 13 and 14, a detected part 144d is provided in the rack holder 144, and when the rack holder 144 is moved in the optical axis direction, transition is made between a transmission state of the photo-interrupter 148 and a light-shielding state thereof due to the detected part 144*d*. The photo-interrupter 148 detects such a transmission state and a light-shielding state, outputs the detected state as a reference signal, and transmits the reference signal to the lens control unit 104. Further, the photo-interrupter 148 outputs a first signal in the light-shielded state and a second signal in the transmission state as the reference signal. Then, the lens control unit 104 determines a position of the rack holder 144 as the origin position on the basis of the received reference signal. Further, the photo-interrupter 148 starts a detection operation if the interchangeable lens 101 enters an energized state.

As described above, the compression coil spring 145 is disposed between the focus group holding frame 141 and the rack holder 144 and biases the rack holder 144 with respect to the focus group holding frame 141 in the optical axis direction. Therefore, even in the retracted state in which movement of the focus group holding frame 141 is restricted, when the focus motor 401*a* is driven, the rack holder 144 can be moved toward the object side in the optical axis direction against the biasing force of the compression coil spring 145.

On the other hand, in a state in which imaging is possible, the contact part 141*e* of the focus group holding frame 141 is separated from the contact part 102*a* of the lens mount 102. Therefore, due to the biasing force of the compression coil spring 145, the contact part 141*e* of the focus group holding frame 141 and the end portion 144*b* of the rack holder 144 come into contact with each other to be in close contact, and the focus group holding frame 141 and the rack holder 144 move integrally. That is, if a position of the rack holder 144 can be detected, a position of the focus group holding frame 141 in a state of capturing image can be specified. Thus, in the present example, in either the first state in which imaging is possible and the second state which is the retracted state in which imaging is restricted, the origin position of the focus group holding frame 141 can be detected via the rack holder 144 having the detected part 144*d*.

Next, with reference to FIGS. 13 and 14, a positional relationship between the photo-interrupter 148 and the detected part 144*d* of the rack holder 144 will be described. A distance in a case of FIG. 13 in which a distance between a light emitting part 148*a* of the photo-interrupter 148 and the detected part 144*d* in the optical axis direction is the largest on the object side in the optical axis direction is assumed to be A. On the other hand, a distance in a case of FIG. 14 in which the distance is the largest on the imaging surface side is assumed to be B. In the present example, a positional relationship is such that A and B are substantially equal, that is, a position of the rack holder 144 determined by the lens control unit 104 is disposed to be substantially at a center of a movement range of the rack holder 144. Thereby, a detection time of the origin position becoming extremely long is curbed under any conditions of a zoom position and a focus position.

FIG. 15 shows a flowchart related to origin detection processing of the present example. Operations (processing) shown in the flowchart of FIG. 15 is controlled by at least one of the camera control unit 12 and the lens control unit 104 executing a computer program. Further, FIG. 15 is an example of the origin detection processing, and the present invention is not limited thereto.

When energization is started from the camera main body 1 to the interchangeable lens 101, first, in S101, the lens control unit 104 acquires information on a detection result of the photo-interrupter 148, that is, acquires information on a signal output by the photo-interrupter 148. At this time, the lens control unit 104 acquires information on whether the detection result of the photo-interrupter 148 is light or no (dark). In the present example, in a case of light, the photo-interrupter 148 determines it to be a transmission state and outputs the second signal. In a case of no (dark), the photo-interrupter 148 determines it to be a light-shielding state and outputs the first signal.

If the detection result of the photo-interrupter 148 is light, the processing proceeds to S102, and if the detection result of the photo-interrupter 148 is dark, the processing proceeds to S106. Next, in S102, the lens control unit 104 controls the focus motor 401*a* of the focus driving unit 401 to move the rack holder 144 to the imaging surface side (camera main body side) at high speed in the optical axis direction. The lens control unit 104 operates in response to an instruction from the camera control unit 12. Thereafter, the processing proceeds to S103. The high speed described here means a maximum speed within a range in which step-out of the focus motor 401*a* does not occur between the rack 146 and the feed screw 401*b* (see a speed 144*e* in FIG. 13). Further, in the retracted state in which imaging is restricted, the detection result of the photo-interrupter 148 being light is a case in which the rack holder 144 and the photo-interrupter 148 are in a positional relationship as illustrated in FIG. 13.

Next, in S103, similarly to S101, the lens control unit 104 acquires information on whether the detection result of the photo-interrupter 148 is light or no (dark). If the result is dark, the processing proceeds to S104, and if the result is light, the processing returns to S102. Next, in S104, the lens control unit 104 controls the focus motor 401*a* of the focus driving unit 401 to reverse a movement direction of the rack holder 144 and move the rack holder 144 to the object side at low speed in the optical axis direction. Then, the processing proceeds to S105. The low speed described here means a speed at which the photo-interrupter 148 can accurately detect the origin position of the detected part 144*d* (see a speed 144*f* in FIG. 13). Next, in S105, the lens control unit 104 acquires information on whether the detection result of the photo-interrupter 148 is light or no (dark) as in S101, and if the information indicates light, detection of the origin position is completed. Thereby, the detection processing of the origin position (reset processing) is completed, and the processing ends. If the information indicates dark, the processing returns to S104.

Next, in S106, the lens control unit 104 controls the focus motor 401*a* of the focus driving unit 401 to move the rack holder 144 to the object side at high speed in the optical axis direction. Thereafter, the processing proceeds to step S107. The high speed described here has the same meaning as the description given in S102 (see a speed 144*g* in FIG. 14). Further, in the retracted state in which imaging is restricted, the detection result of the photo-interrupter 148 being dark is a case in which the rack holder 144 and the photo-interrupter 148 are in a positional relationship as illustrated in FIG. 14. As described above, the camera control unit 12 controls the focus motor 401*a* to move the rack holder 144 according to the detection result (detected signal) of the photo-interrupter 148 regardless of the first state in which imaging is possible and the second state in which imaging is restricted. Therefore, even in the second state in which imaging is restricted, detection processing of the origin position can be immediately started when the interchangeable lens 101 enters an energized state.

Next, in S107, similarly to S101, the lens control unit 104 acquires information on whether the detection result of the photo-interrupter 148 is light or no (dark), and if the detection result is light, the processing proceeds to S108. If the detection result is dark, the processing returns to step S106.

Next, in S108, similarly to S102, the lens control unit 104 controls the focus motor 401*a* of the focus driving unit 401 to move the rack holder 144 to the imaging surface side at high speed in the optical axis direction. The high speed described here has the same meaning as the description given in S102 (see a speed 144*h* in FIG. 14). Thereafter, the processing proceeds to step S109. Next, in S109, as in S101, the lens control unit 104 acquires information on whether the detection result of the photo-interrupter 148 is light or no (dark), if the detection result is dark, the processing proceeds to S110, and if the detection result is light, the processing returns to step S108.

Next, in S110, similarly to S104, the lens control unit 104 controls the focus motor 401*a* of the focus driving unit 401 to reverse a movement direction of the rack holder 144 and move the rack holder 144 to the object side at low speed in the optical axis direction. The low speed described here has the same meaning as the description given in 5104 (see a speed 144*i* in FIG. 14). Thereafter, the processing proceeds to S111. Next, in S111, the lens control unit 104 acquires information on whether the detection result of the photo-interrupter 148 is light or no (dark) as in S105, and if the information indicates light, detection of the origin position is completed. Thereby, the detection processing of the origin position (reset processing) is completed, and the processing ends. If the information indicates dark, the processing returns to S110.

In this way, a direction of the rack holder 144 moving along the optical axis changes according to information on whether the detection result of the photo-interrupter 148 is light or no (dark). That is, the lens control unit 104 controls the focus motor 401*a* of the focus driving unit 401 to change a direction of the driving according to the detected signal. Then, in either the first state or the second state, if the interchangeable lens 101 is in an energized state, the rack holder 144 can be made movable in any direction along the optical axis by driving the focus motor 401*a* of the focus driving unit 401. Therefore, in either the first state or the second state, the photo-interrupter 148 can detect the detected part 144*d* provided in the rack holder 144.

According to the above-described processing, the origin position of the rack holder 144 is detected. After the origin position of the rack holder 144 is detected, the lens control unit 104 controls the focus motor 401*a* of the focus driving unit 401 to move the rack holder 144 to a position before the origin position is detected or a predetermined position (for example, a focus position at the wide-angle end). Also, the photo-interrupter 148 continues to detect the detected part 144*d* until the end of the above-described processing. After the processing ends, the detection operation is stopped.

In the present example, the photo-interrupter 148 is used to detect light and dark, but for example, any threshold value by High and Low (for example, a degree of luminance) may also be used. Also, in order to detect the origin position more quickly, a plurality of photo-interrupters 148 may be provided, or a plurality of detected parts 144*d* of the rack holder 144 may be provided.

According to the present example, even if movement of the focus group 114 is restricted in the second state, which is the retracted state in which imaging is restricted, detection processing of the origin position can be executed via the rack holder 144. Therefore, the interchangeable lens (optical apparatus) 101 in which a time required before a start of imaging can be reduced, portability is high, and loss of imaging opportunities is curbed can be provided.

Also, in the present example, in order to enable accurate detection of the origin position, the rack holder 144 is moved to the object side at low speed when the origin position is detected, but the present invention is not limited thereto, and the rack holder 144 may be moved at high speed as long as the origin position can be accurately detected. Further, the method of detecting the origin position in FIGS. 13 and 14 is an example as described above, and at the time of detecting the origin position, the rack holder 144 may be moved to the imaging surface side (camera main body side) at low speed in the optical axis direction to detect the origin position. That is, if the detection result is dark after the power is supplied to the interchangeable lens 101, the origin position is detected by moving the rack holder 144 to the object side at high speed in the optical axis direction and then moving it to the imaging surface side at low speed in the optical axis direction.

Further, the detected part 144*d* is provided in the rack holder 144 in the present example, but the present invention is not limited thereto, and one or more detected parts 144*d* may be provided in the rack 146. Then, the same processing as described above may be performed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-115520, Jul. 13, 2021, which is hereby incorporated by reference wherein in its entirety.

What is claimed is:

1. An optical apparatus comprising:
a holding frame holding an optical system;
an intermediate member;
a driving unit moving the intermediate member in a direction along an optical axis of the optical system;
a biasing member biasing the holding frame in a direction along the optical axis with respect to the intermediate member; and
a detection unit detecting the intermediate member, wherein the optical apparatus takes:
a first state in which a part of the holding frame is brought into contact with a part of the intermediate member according to a biasing force of the biasing member; and
a second state in which the holding frame is separated from the intermediate member against the biasing force of the biasing member, and
wherein the driving unit is able to move the intermediate member in a direction along the optical axis in either the first state or the second state, and the detection unit is able to detect the intermediate member at least in the second state.

2. The optical apparatus according to claim 1, wherein the first state is a state in which the optical system is at a position at which imaging is possible.

3. The optical apparatus according to claim 1, wherein the second state is a state in which the optical system is at a retracted position and imaging is restricted.

4. The optical apparatus according to claim 1, wherein the optical system includes a focus lens and focusing is possible when the driving unit moves the focus lens in a direction along the optical axis.

5. The optical apparatus according to claim 1, wherein, if the optical apparatus enters an energized state, the detection unit detects the intermediate member when the driving unit moves the intermediate member in a direction along the optical axis.

6. The optical apparatus according to claim 1, wherein the biasing member is disposed between the holding frame and the intermediate member.

7. The optical apparatus according to claim 1, wherein:
the detection unit outputs a first signal if the intermediate member is detected and outputs a second signal which is different from the first signal if the intermediate member is not detected, and
the optical apparatus further comprises a control unit which determines a position of the intermediate member on the basis of the first signal and the second signal.

8. The optical apparatus according to claim 7, wherein a position of the intermediate member determined by the control unit is substantially a center of a movement range of the intermediate member.

9. The optical apparatus according to claim 1, further comprising:
a base barrel which holds the holding frame to be movable in a direction along the optical axis,
wherein the first state shifts to the second state when the base barrel moves in a direction along the optical axis.

10. The optical apparatus according to claim 9, further comprising:
a fixed member including a contact part which comes into contact with the holding frame,
wherein the contact part separates the holding frame from the intermediate member against the biasing force of the biasing member when the base barrel moves in a direction opposite to an object side along the optical axis.

11. The optical apparatus according to claim 9, further comprising:
an operation member which is rotatable in a radial direction around the optical axis,
wherein the base barrel moves in a direction along the optical axis in conjunction with rotation of the operation member.

12. The optical apparatus according to claim 1, wherein:
the intermediate member includes a first intermediate member which meshes with a screw provided on a rotating shaft of the driving unit and a second intermediate member which is engaged with the first intermediate member, and
the second intermediate member moves in a direction along the optical axis in conjunction with movement of the first intermediate member.

13. The optical apparatus according to claim 1, wherein the optical apparatus is an interchangeable lens.

* * * * *